Aug. 14, 1945.  J. H. COOMBES  2,382,543
BRAKE MECHANISM
Filed Feb. 29, 1944
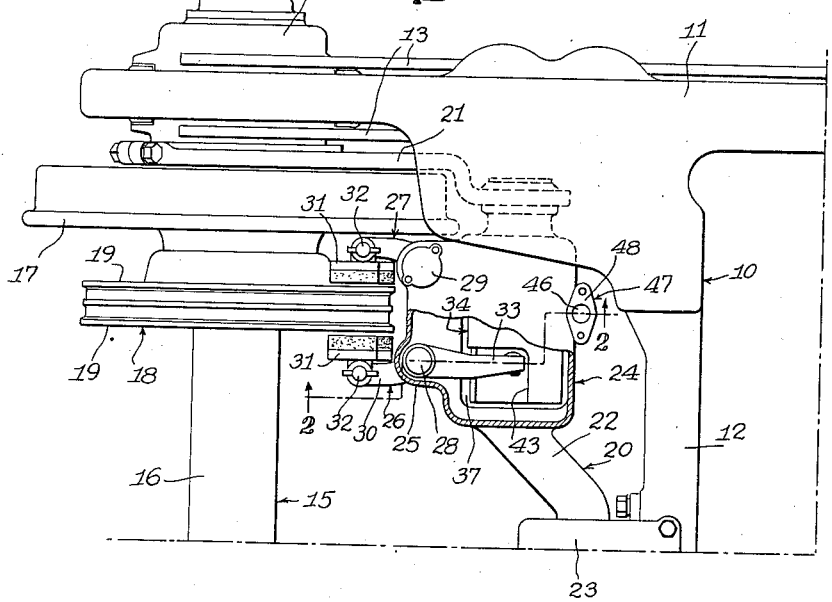
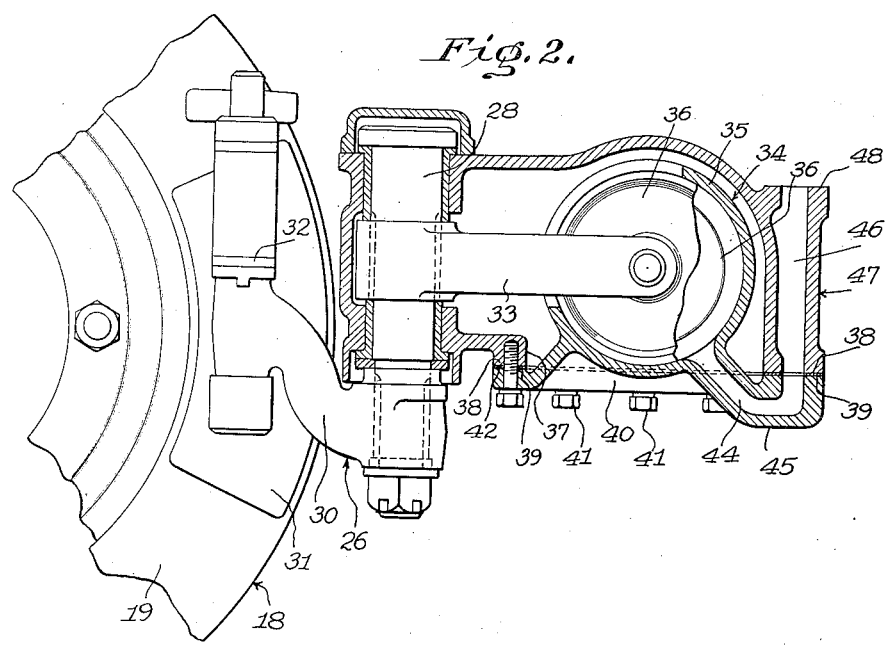
INVENTOR.
Joseph H. Coombes
BY
John P. Tarbox
ATTORNEY Patented Aug. 14, 1945

2,382,543

UNITED STATES PATENT OFFICE 2,382,543

BRAKE MECHANISM

Joseph H. Coombes, Detroit, Mich., assignor to Budd Wheel Company, Philadelphia, Pa., a corporation of Pennsylvania Application February 29, 1944, Serial No. 524,373

4 Claims. (Cl. 188—153)

The invention relates to brake mechanisms and more particularly to a fluid-actuated such mechanism.

The invention is concerned more especially with brakes of the type disclosed in copending application, Serial No. 399,779, filed June 26, 1941, in which rotary disc-like brake elements are associated with the wheels of a wheel and axle assembly supporting a truck frame, and the non-rotary brake elements cooperating with said rotary elements are mounted on a generally U- or C-shaped brake support which is in turn supported at its sides from the wheel and axle assembly and, at an intermediate point, by the truck frame. Such brake supports generally comprise an enlarged housing in the vicinity of the rotary brake element, which housing encloses, in large part the brake actuating means.

It is a principal object of the invention to make this housing construction as compact as possible and to make the parts mounted therein readily accessible. A particular object is to provide a demountable bottom cover for the housing, which cover has formed integrally therewith a cylinder actuator, and to provide simplified means whereby the duct, through which fluid under pressure is admitted to the cylinder, is led to the top of the housing where the usual flexible pipe may be connected thereto and be removed from a position close to the tracks where it would be subject to damage due to flying ballast, or the like.

Other and further objects and advantages and the manner in which they are attained will become clear from the following detailed description when read in connection with the drawing forming a part of this specification.

In the drawing:

Fig. 1 is a plan view of one quarter of a railway truck to which the invention is shown applied, parts being broken away and shown in horizontal section, and Fig. 2 is an enlarged vertical longitudinal sectional view through the brake support housing, the view being taken substantially along the line 2—2 of Fig. 1.

In the embodiment selected for illustration, the truck frame is designated generally by the reference numeral 10. It has the side frame members, as 11, interconnected by transoms, as 12. The truck frame is spring-supported in the usual fashion from equalizer bars, as 13, the ends of which rest on top of the journal boxes, as 14, at the ends of the wheel and axle assembly, as 15.

Each wheel and axle assembly 15 comprises an axle, as 16, journaled in the journal boxes and a pair of wheels, as 17, are mounted thereon adjacent each journal box. With each wheel 17 is associated a rotary brake element, such as the disc-like element 18, having opposed radial braking faces 19, 19. The rotary element 18 may be bolted in usual manner to the associated wheel hub to rotate therewith.

The brake support may comprise a substantially U- or C-shaped frame or yoke, designated generally by the reference numeral 20, comprising longitudinally extending side arms, as 21, supported on the respective journal boxes 14 and interconnected at their ends remote from the journal boxes by a tubular transverse member 22, the central portion of which is offset toward the adjacent transon 12 and is supported in a bracket 23 bolted to the transon, all in a manner generally similar to the support disclosed in the copending application above referred to.

Adjacent the rotary brake element 18, the transverse member is enlarged in vertical and longitudinal direction to form a housing, generally designated 24, enclosing the greater part of the brake mechanism associated with said adjacent rotary brake element.

In the portion 25 of the housing next adjacent the rotary element 18 are mounted a pair of brake levers 26 and 27 journaled in the housing, respectively, through pivot portions 28 and 29. Each lever has an outside extending arm, as 30, carrying one of the non-rotary brake members, as the segmental shoes 31, arranged to cooperate with the opposed faces 19, 19 of the rotary element 18. The respective shoes 31 are pivotally mounted, as at 32, to the respective outside arms 30 of the brake levers.

The levers 26 and 27 have further arms, as 33, which extend into the housing for cooperation with a brake cylinder actuator therein, designated generally by the numeral 34.

Such actuator may comprise an open-ended cylinder 35 and a pair of pistons 36 movable therein, the pistons being arranged to cooperate with the arms 33 of the respective levers to force them apart and apply the brakes.

For convenience of assembly and disassembly and for ready accessibility to the cylinder actuator, it is preferably demountably associated with the housing 24. To this end the bottom of the housing is provided with an opening, as 37, large enough to allow the cylinder to pass through it, said opening having a reinforced machined seat, as 38, extending around it, this seat being adapted to mate with a corresponding seat, as 39, formed on a cover portion 40 integral with the cylinder 35. When the parts are assembled with the seats 38 and 39 in mating relation the cover is bolted, as by bolts 41, to the main body of the housing and the joint may be made tight by the use of an intervened gasket, as 42.

Suitable spring means, not shown, may be provided between the levers 26 and 27 within the incasing to return the shoes and levers to the inoperative position shown and suitable stops, also not shown, may be provided to prevent return beyond the position shown.

The levers 26 and 27 have a mere abutting engagement with the respective pistons 36 and the cylinder 35 has cutaway portions, as 43, at each end to permit the passage of the lever arms 33 into the cylinder and to allow the cylinder to pass them in the assembly and disassembly of the cylinder and attached cover.

The bottom arrangement of the removable cover and cylinder actuator is desirable, since its assembly and disassembly is thereby facilitated, particularly when the truck is over a repair pit. This bottom arrangement, however, necessitates that the port leading the compressed air or other fluid into the cylinder between the pistons to force them apart to apply the brakes, be passed through the cover, and to avoid attaching the usual flexible hose to the bottom cover, where it is close to the tracks and exposed to damage by flying ballast or the like, a novel arrangement has been provided for passing the duct leading from the inside of the cylinder to the top of the housing.

To this end a portion of the duct, as 44, is provided in a thickened portion 45 of the cover 40, this portion leading from the space between the pistons 36 to the seat 39, and a mating or aligned extension 46 of the portion 45 extends upwardly from the seat 37 through a thickened portion 47 of the housing wall to the top of the housing. The upper end of the duct extension 46 is provided around it with a seat 48, to which the usual fitting, not shown, attached to the end of a flexible fluid conveying hose or tube (not shown) may be secured. The gasket 42 insures a tight joint between the two portions 44 and 46 of the duct.

The operation of the mechanism is believed clear from the foregoing detailed description.

While a specific embodiment of the invention has been herein described, it will be understood that changes and modifications may be made without departing from the main features of the invention, and such changes and modifications are intended to be covered by the appended claims.

What is claimed is:

1. In a brake mechanism, a non-rotary brake element, a closed housing support therefor, a brake lever pivotally mounted in said housing and having one arm thereof extending outside the housing for cooperation with said non-rotary brake element and another arm extending within the housing, a cylinder actuator within the housing for cooperation with said arm, an opening through the bottom of the housing through which the cylinder actuator may be removed, a seat around said opening and a cover integral with said cylinder actuator demountably secured to said seat, a duct leading from said seat through the wall of the housing to the top of said housing, and a duct having its end aligned with said first-named duct and leading through the cover and cylinder walls to the cylinder bore.

2. In a brake mechanism for railway trucks, a truck frame, a wheel and axle assembly carrying said frame, a rotary disc-like brake member rotatable with a wheel of said assembly, a pair of non-rotary brake elements arranged to operatively engage the opposite faces of said rotary member, a brake support including a transverse member comprising a closed housing arranged adjacent the periphery of said rotary member, a pair of brake levers pivoted in said housing and having outer arms cooperating with the respective non-rotary elements and having further inwardly extending arms within the housing, a cylinder actuator within the housing and disposed between said inwardly extending arms in mere abutting relation therewith, the cylinder actuator being carried by a cover fitting a seat around a downwardly presenting opening provided in the main body of the housing and permitting the passage of the cylinder actuator from between said inwardly extending arms of the levers and to the outside of the main body of the housing, and demountable means for securing said cover to said seat to close the housing with the cylinder actuator disposed between said inwardly extending arms.

3. In a brake mechanism, a brake shoe, a housing for supporting said shoe, a brake lever pivoted on the housing intermediate its ends and having one arm cooperating with said shoe and another arm extending into the housing, a brake cylinder actuator within said housing for operative engagement with said arm, the main body of said housing having an opening therein to permit the passage of said cylinder actuator, and the cylinder actuator being integral with a cover for closing said opening, means demountably securing said cover to a seat surrounding said opening, and a duct leading from the bore of said cylinder actuator through the joint between said cover and main body of the housing to an outlet in the outer wall of the main body of the housing.

4. In a brake mechanism, a housing mounting a brake lever and a cylinder actuator for said lever, the cylinder actuator being arranged within the housing and the housing being divided into an upper main body portion and a lower cover portion, the latter being integral with the cylinder actuator, means removably securing the cover portion to the main body portion to form a closed housing, the opening in the main body portion permitting the cylinder to pass therethrough in the mounting and demounting of the cover, and a duct for leading fluid under pressure to the cylinder actuator extending from the cylinder bore through the cover portion and the point between the cover portion and the main body portion and terminating in the outer face of said main body portion.

JOSEPH H. COOMBES.